Jan. 11, 1966 R. K. SUTZ 3,229,011
METHOD OF FORMING THERMOSET ARTICLES
Filed March 24, 1958 3 Sheets-Sheet 1

INVENTOR.
Richard K. Sutz.
BY Everett A. Johnson
ATTORNEY

Jan. 11, 1966   R. K. SUTZ   3,229,011
METHOD OF FORMING THERMOSET ARTICLES
Filed March 24, 1958   3 Sheets-Sheet 2
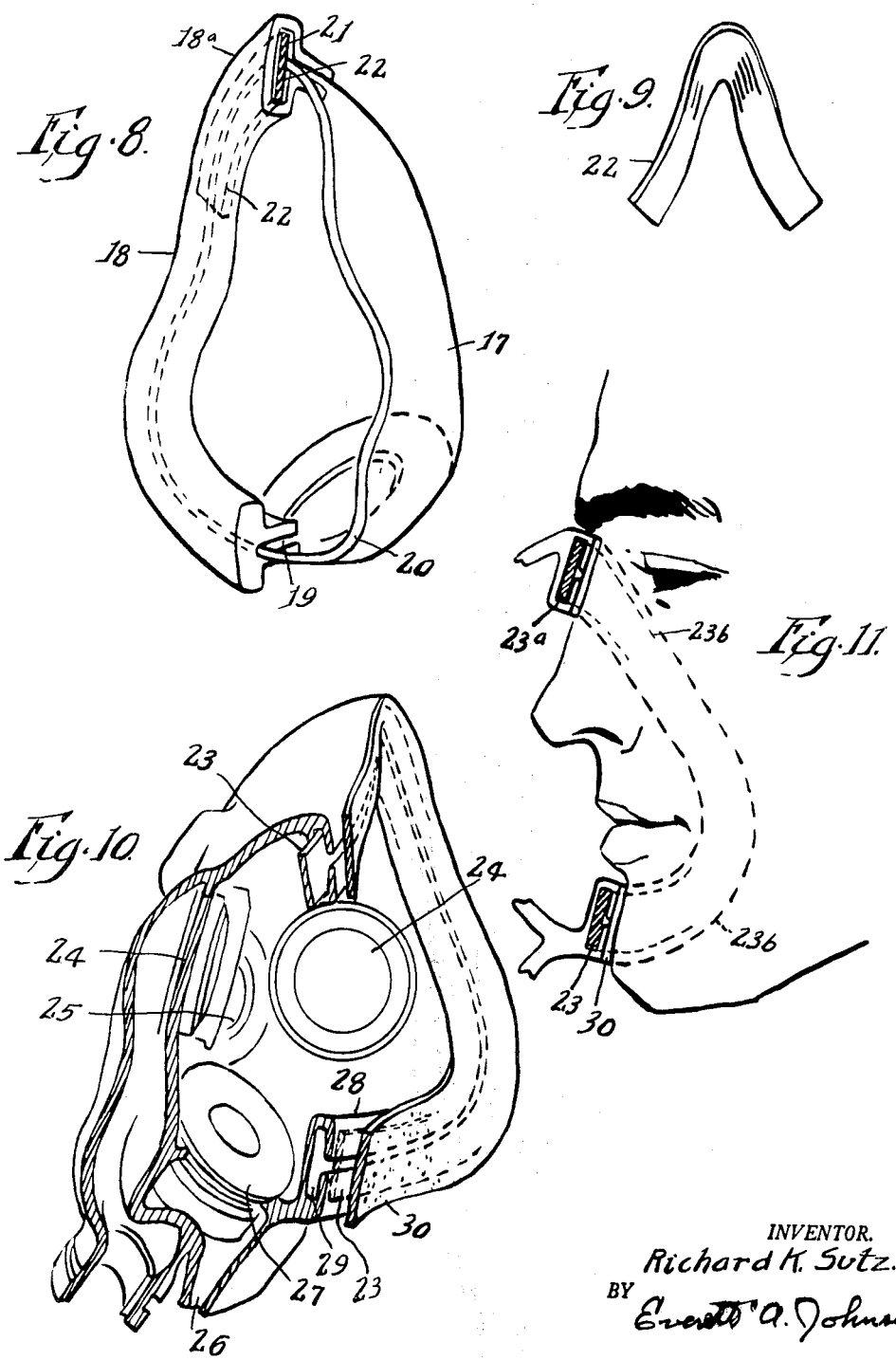
INVENTOR.
Richard K. Sutz.
BY Everett A. Johnson
ATTORNEY Jan. 11, 1966  R. K. SUTZ  3,229,011
METHOD OF FORMING THERMOSET ARTICLES
Filed March 24, 1958  3 Sheets-Sheet 3

INVENTOR.
Richard K. Sutz.
BY
Everett A. Johnson
ATTORNEY

United States Patent Office 3,229,011
Patented Jan. 11, 1966

3,229,011
METHOD OF FORMING THERMOSET ARTICLES
Richard K. Sutz, Arlington, Va., assignor of two-thirds to Everett A. Johnson, Park Ridge, Ill.
Filed Mar. 24, 1958, Ser. No. 723,450
13 Claims. (Cl. 264—160)

This invention relates to thermal molding of preimpregnated plastic materials. More particularly, it relates to the molding of reinforced or filled thermosetting plastic laminates.

In the field of plastics, the reinforced laminates refer to reinforced materials wherein the fibers, such as glass fibers, are of a continuous nature. There are other types of plastics, however, wherein the reinforcing material is of a discontinuous nature; and some of the materials in this second class have relatively short or random lengths of glass or asbestos fibers dispersed rather than well orientated in the material.

The reinforced plastic laminates, to which this invention relates, are uncured or unhardened moldable sheet-stock of laminated reinforced plastics. Such plastics may be formed and then hardened or cured by heat for a selected period of time while being maintained under light pressure. Heretofore however, such forming and curing of these materials have been in a manner similar to the stamping and forming of sheet metal. In such prior practice, it has been necessary to form a pattern and subsequently design and construct metal-forming dies from which the molded laminate was then produced. Because of the deficiencies in the techniques heretofore used and to prevent warping, it has been necessary to retain the cured articles within the dies until they are substantially cooled. However, in an effort to increase the production rate, it has been the practice to remove the articles from the dies and cool them on individual jigs to prevent their warping. These techniques are both time-consuming and expensive, and are uneconomical for the production of small runs of a large number of generally similar but different objects. Further, the prior techniques have not been adaptable to perishable or fragile patterns.

There are forms of apparatus, however, where substantially all of the components are standard, but wherein a certain component is uniquely designed to conform to a specific contour. One such apparatus is the face mask used by airplane pilots to supply them with oxygen during high altitude flights. Heretofore three or four sizes of face masks have been available, rubber seals or padding being used in an effort to provide a universal (but never personal) fit. Similar problems have reduced the acceptance of other articles requiring personalized fitting, such as anatomical casts, braces, girdles, supporters, and other body shields and covers. In addition, unique contours and geometrical shapes are required for various articles of manufacture. But despite the availability of excellent thermosetting laminates for the mass production of the above, the systems and apparatus heretofore available for molding and curing such laminates have not been adaptable to such personalized and unique contours.

It is, therefore, a primary object of this invention to provide a system for the production of articles from reinforced plastic laminates, such articles being form-fitting with respect to a uniquely contoured body or element. A further object of the invention is to provide a system for molndig and curing thermosetting plastic laminates without the use of matched die molds and all of the difficulties encountered as outlined above. Still another object of the invention is to provide a method of molding plastic laminates in which impressions can be accurately reproduced using low pressures and inexpensive equipment. An additional object of the invention is to provide method and apparatus for molding and curing plastic laminates which are well adapted to producing small runs of one of a kind.

A further object of the invention is to provide a system for producing skeleton or frame means for articles intended to be worn on the human body. A more specific object of the invention is to provide a system for producing contoured frame means adapted to be used with other components whereby a personalized fit is obtained. Still another object of this invention is to provide a system of supporting and restraining a molded plastic article without the aid of special jigs and without requiring the retention of the molded article in matching dies. These and other objects of the invention will become apparent as my description thereof proceeds.

To attain the objects of my invention, I employ a plastic laminate which is characterized by being thermoplastic so that it may be formed at one temperature level, cooled to a lower temperature level to preserve the form, restrained in its molded form, and cured at an elevated temperature for a selected time until it has hardened in the form corresponding to the pattern. The system is particularly adaptable to situations wherein the pattern is perishable or cannot tolerate high temperatures and pressures. Typically, the laminated plastic consists of one or more sheets of plastic reinforced with lineally aligned glass filaments, the filaments being straight and parallel in each sheet. In one commercially available thermosetting plastic, each sheet comprises about 60% glass fiber and 40% plastic resin, one such resin being phenol-formaldehyde resin. In general, modified urea, phenol-formaldehyde, styrene, polyester melamine and epoxy resins are some of the possible low pressure bonding materials which may be used in producing such reitnforced plastics.

In following the process, I preheat the plastic sheet sufficiently to permit its being formed as desired. It is then cooled so that it may be handled without distortion. The cooled uncured article is then supported by surrounding it with a fluent granular material, such as metal shot, glass beads, or sand, and finally while so supported the preformed article is cured by subjecting it to thermosetting temperatures. Upon completion of the curing cycle, the fluent supporting material is simply withdrawn and the article is ready for further processing with utilization.

Further details and advantages of my invention will be described by reference to the accompanying drawing wherein:

FIGURE 8 is a perspective of one embodiment of my invention as applied to an oral-nasal face mask;

FIGURE 9 is a perspective view of a partial form-fitting insert for use with the face mask of FIGURE 8;

FIGURE 10 illustrates another type of face mask to which the invention is applicable;

FIGURE 11 is a side view of a mask, partly in section and with face mask components removed, illustrating an embodiment of skeleton or frame which may be used in either of the face masks in FIGURES 8 and 10;

To illustrate the general principles of my system in the manufacture of articles from reinforced plastic laminates, I will make reference to FIGURES 1 through 7 of the drawings. The laminates I use in attaining the objects of my invention comprise sheets of reinforced or filled plastics. A preferred material for my purposes is a thermoplastic and thermosetting reinforced plastic marketed by the Minnesota Mining and Manufacturing Company as "Scotchply" brand, Type 1002. This material is available in both sheet and tape form and comprises one or more sheets of plastic reinforced with linearly aligned contiguous glass filaments, together with a heat-curable resin.

Such laminates are characterized by being capable of being molded or formed at one temperature level, by being relatively rigid when cooled to a lower temperature so that the molded material may be removed from their patterns and yet retain the molded form, and by being thermosetting so that elevated heating at a selected temperature for a selected time hardens the sheet in the form of the pattern, although removed therefrom at the time of curing.

Figure 1:
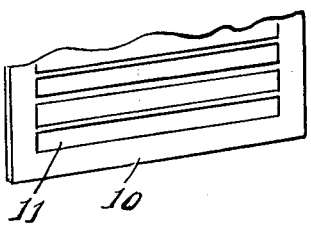
FIGURE 1 is a perspective of a sheet of thermoplastic material carrying outlines of a typical blank thereon.

Referring to FIGURE 1, I have illustrated a sheet 10 of thermoplastic material with the outlines of an article 11 marked thereon. These articles 11 may be cut from the sheet 10 by any suitable means, such as a razor-blade or scissors. A linoleum knife or similar instrument can be used for cutting sheets up to about one-eighth inch in thickness. Heavier weights require shearing, hack sawing or band sawing. However, the articles 11 may be stamped out in a manner similar to the handling of sheet metal. Whatever the cutting tool used, it may be kept clean by wiping with a cloth saturated with acetone or other solvent.

Figure 2:
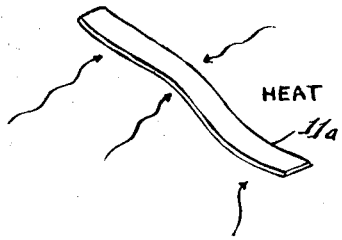
FIGURE 2 illustrates schematically the step of heating the cut blank.

In FIGURE 2, the article 11 is subjected to heating to a molding temperature, and for may commercially available reinforced materials, this temperature is in the case of Scotchply somewhat above room temperature, i.e. in the range of 100° F. to 120° F. The heating may be effected by infrared lamps, by dipping in hot water, spraying with steam or the like. However, in many instances, the necessary heat for molding can be supplied by body heat or by the heat of the pattern.

Figure 3:
FIGURE 3 illustrates the molding of the thermoplastic strip of FIGURE 2 about a typical pattern.

In FIGURE 3, the article 11a is shown being molded to a pattern 12 after being heated, as shown in FIGURE 2. The molding of the thermoplastic article 11a to the pattern 12 may be by hand as shown, or by mechanical means.

Figure 4:
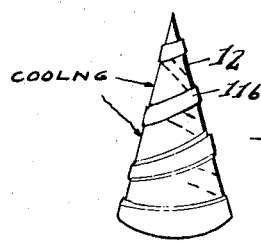
FIGURE 4 is a view of the formed element following its cooling to render it temporarily non-deformable.

While on the pattern 12, as shown in FIGURE 4, the element or article 11a of FIGURE 3 is cooled to room temperature or lower, at which temperature the element 11b of FIGURE 4 is produced which is sufficiently rigid to be removed from the pattern 12 and be handled without distortion. Such cooling can be by blasting with a cooling fluid, e.g. air, water, etc., or by heat dissipation to the atmosphere.

Figure 5:
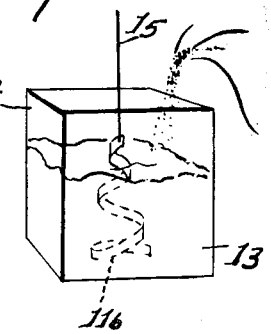
FIGURE 5 shows the steps of supporting the cooled uncured article of FIGURE 4 within a mass of fluent solids.
Figure 6:
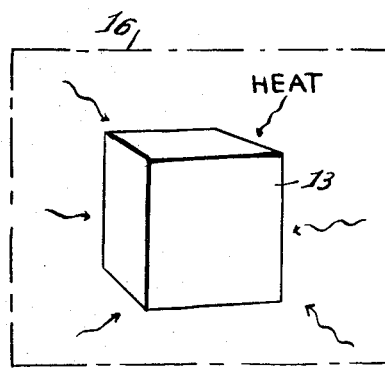
FIGURE 6 represents the application of heat to the supported article of FIGURE 5.

In FIGURES 5 and 6, the formed and precooled molded element 11b is suspended by a line 15 within a suitable container 13 and supported in its molded form by a mass 14 of fluent solids in intimate contact with all surfaces of the element 11b. For this purpose, refractory fluent solids such as sand, metal shot, glass beads, cured thermoset resin beads, and the like are satisfactory. The fluent solids are initially at a temperature low enough to avoid making the element 11b thermoplastic and, if desired, the solids may be precooled.

Once the fluent solids 14 completely submerge the element 11b, any possible movement or distortion of the molded element 11b is prevented as the temperature is increased to effect the curing. In addition, the fluent solids mass 14 prevents warping of the curing article as it cools.

With the element 11b supported within the container 13 by the mass 14 of fluent solids, the temperature may be increased by placing the container 13 within a heated zone such as an oven 16. Curing cycles of 10 minutes at 400° F., 20 to 30 minutes at 330° F., and 60 to 100 minutes at 270° F. are typical for a reinforced epoxy laminate such as Scotchply.

During this curing cycle, pressure on the mass 14 sufficient to support the formed element 11b and to restrain any undesired movement thereof during the curing cycle are all that is necessary, and I have found that pressures from substantially atmospheric to about 10 p.s.i.g. are adequate.

Figure 7:
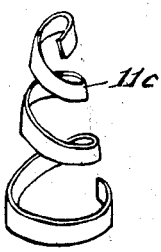
FIGURE 7 is a perspective view of a cured and finished item of manufacture.

The cured and finished article 11c is shown in FIGURE 7, and schematically illustrates a product which may be produced by my techniques.

This method of producing articles molded to a pattern may be applied to the making of a number of things which benefit by a personalized fit, such articles including face masks, arch-supporters, splints, artificial limbs and many other similar articles. However, I will now describe additional embodiments of the invention illustrated in FIGURES 8 to 15 which relate to the production of face masks.

The industry has heretofore been handicapped by reason of the cost of metal dies, and has therefore confined itself to providing three or four stock-sizes and, accordingly, many of the masks have been uncomfortable and have not been leak-proof. Now, for the first time, an individual pilot, skin diver, fire fighter, and the like can be provided with a comfortable, contour-fitting, leak-proofing face mask.

Referring to FIGURE 8, the mask comprises a transparent shell 17 which is of generally conventional design, and is provided with a soft rubber or the like T-shaped gasket 18 having a channel 19 adapted to receive the open edge of the shell 17. In the nose portion 18a of the gasket 18 there is provided a recess 24 communicating with the channel 19. Within the recess 21 is a form-fitting rigid frame insert 22.

The insert 22, separately shown in FIGURE 9, is dimensioned to fit the recess 21 with substantial precision and is put in place by spreading the resilient side walls of the channel 19.

The form-fitting insert 22, illustrated in FIGURE 9, covers the bridge of the nose and extends down to the cheek bones on each side of the face. Most of the difficulties in form-fitting occur in this region, and accordingly many mask constructions are greatly improved by providing the partial frame insert 22.

The insert 22 is preformed by my novel method as illustrated in FIGURES 12 to 15 inclusive, and accurately fits the simple and compound curves comprising the contour of the user's nasal and maxially regions.

In FIGURES 10 and 11 further details are given of another embodiment of a face mask wherein a frame member 23 has a nose-fitting portion 23a, cheek-fitting portions 23b and 23c, and a chin-fitting portion 23d.

The mask of FIGURE 10 includes the inlet valves 24, microphone port 25, exhalation port 26, exhalation valve 27, and a sealing lip 28. Within the sealing lip 28 is a recess 29 which accommodates the frame member 23 which is enclosed by the sponge rubber gasket 30 and supports the mask assembly in sealing contact with the face as shown in FIGURE 11.

Figure 12:
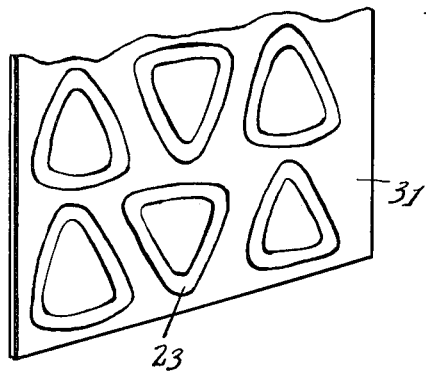
FIGURE 12 shows a sheet of thermoplastic material with the outlines of the skeleton or frame insert of FIGURE 11 marked thereon.
Figure 13:
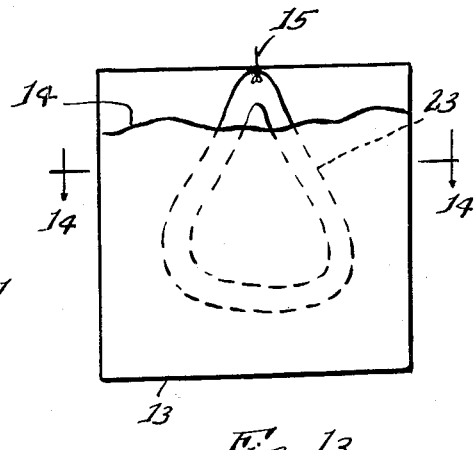
FIGURE 13 is an elevation of the molded uncured but rigid (by cooling) plastic insert within an restraining mass of fluent solids.
Figure 15:
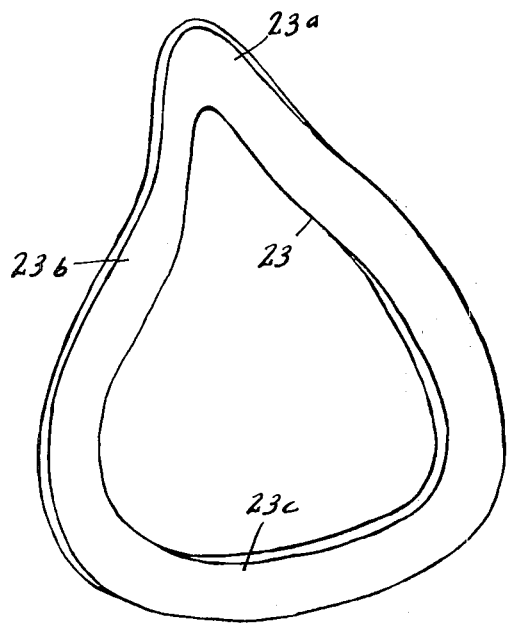
FIGURE 15 is a perspective of the cured article shown in position on the face in FIGURE 11.
Figure 14:
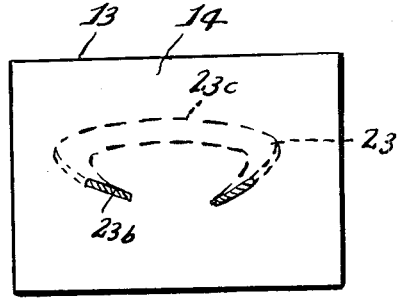
FIGURE 14 is a view taken along the line 14—14 of FIGURE 13, showing the article in its restrained position which it occupies during the curing cycle.

The frame inserts 22 and 23 are cut from a sheet 31, as illustrated in FIGURE 12, molded to the contour of the user's face to produce the simple and compound curves illustrated in FIGURES 9 and 15. The molded member 22 or 23 is then cooled as described in connected with FIGURE 4, and placed within the container 13 as shown in FIGURES 13 and 14 to be surrounded with a mass 14 of fluent solids and processed as described in connection with FIGURES 5 and 6. The finished article is shown in FIGURE 15 and is placed within the masks as described above with respect to FIGURES 8, 10 and 11. The cured frame members 22 and 23 are permanently rigid, conform to the portion of the face in question, and insures a perfect leak-proof fit of the soft rubber gasket 30 by forcing it into intimate contact with the face.

This preformed rigid member may be used in any situation where stock sizes are not suitable and an individual fit is desirable.

For these purposes, it is contemplated that each face mask, helmet, or the like would be supplied with one or more molded frame members or inserts. A kit including a plurality of blanked frame members, a quantity of supporting refractory fluent solids, and a fire-resistant container suitable for curing in available clinical or household furnaces or ovens may also be supplied.

Recent compilations of anthropometric measurements indicate that there are approximately 12 basic facial contours. It would be impractical, of course, to produce masks in so many different sizes. However, by producing the removable contoured frame member, I may utilize essentially standard basic mask forms which would be rendered "personalized" by the proper selection and insertion of the most approxpriate anatomical frame member. It is contemplated, of course, that a preformed and precured frame member for insertion in such forms can be produced by the techniques described herein from mannequins whose body contours have been determined in the studies referred to.

Although I have described my invention by reference to details of preferred embodiments, it should be understood that these are by way of illustration only and that the invention is not necessarily limited thereto. Thus, it is intended that the contoured element may be adapted to any article of manufacture. Accordingly, it is contemplated that those skilled in the art will be enabled to make modifications in the apparatus and in the operating techniques without departing from the spirit of my invention.

What I claim is:

1. The method of producing a preformed element which comprises the steps of cutting the element from a thermosetting plastic sheet, heating the element to render it plastic and moldable, molding the plastic element to the desired shape, cooling the molded element to render it temporarily rigid in the said desired shape, placing the cooled element within a curing zone immobilizing the element within said curing zone within a confined mass of a fluent solid material to support it in its molded form, said fluent solid material being placed at a temperature below that which renders the element plastic and moldable, and heat curing the immobilized element to retain the molded form thereof permanently.

2. A method of producing an article of manufacture which comprises in combination the steps of cutting a two-dimensional blank from a sheet of thermosetting plastic material, heating the two-dimensional blank sufficiently to render it plastic, molding the two-dimensional blank sufficiently to render it plastic, molding the two-dimensional blank while in a plastic state to the desired contour, such molding producing a three-dimensional article, cooling the molded three-dimensional article sufficiently to render it temporarily nondeformable, immobilizing the cooled article in its three-dimensional shape within a curing zone by placing a mass of fluent solids below and about the article, said solids being placed at substantially below the curing temperature and without thermally deforming the article, said article being immobilized by a confined mass of fluent solid material at a temperature below the desired curing temperature, and raising the temperature of the curing zone sufficiently to thermoset the immobilized three-dimensional article in a permanently molded form.

3. The method of claim 1 wherein the cured molded element is cooled in the curing zone while supported on the mass of fluent solid material.

4. In a method for producing a rigid three-dimensional article from a two-dimensional thermosettable plastic sheet material, the improvement which comprises heating the two-dimensional article sufficient to render it plastic, placing the heated plastic two-dimensional article upon a body, molding the two-dimensional article to the surface contour of said body to produce a three-dimensional article, cooling the said three-dimensional article while maintained in contact with said body thereby imparting to the three-dimensional article a rigidity sufficient to permit handling without distorting its molded shape, supporting the cooled molded article within a curing zone, tamping a mass of finely divided precooled refractory solids about said molded article within said curing zone, thereby supporting said molded article to prevent its distortion at elevated curing temperatures, and subsequently elevating the temperature of the curing zone sufficient to thermoset the article in its molded form.

5. The method of claim 4 wherein said sheet material comprises a laminated glass fiber reinforced epoxy resin.

6. The method of claim 4 wherein said finely divided solids comprise metal shot.

7. The method of claim 4 wherein said finely divided solids comprise sand.

8. The method of claim 4 wherein said sheet is rendered thermoplastic by heating to a temperature in the range of 100° F. to 120° F., and wherein said curing is effected at an elevated temperature in the range of 270° F. to 400° F. for a time of between about ten minutes and 100 minutes.

9. The method of claim 4 wherein the cured article is maintained immersed within a supporting mass of fluent refractory solids during cooling of the cured article to prevent warping thereof as it cools down.

10. In the method of producing a frame member for a face mask comprising a substantially rigid element preformed to fit the contour of a particular face, said member having been produced from a thermosetting reinforced plastic sheet by rendering the sheet plastic, the steps of shaping said sheet to the face of the wearer, maintaining said shaped member on said face while cooling said shaped member to render it temporarily rigid, immediately supporting the cooled and temporarily rigid shaped member by means of a confined mass of fluent solids, said solids being at a temperature below that which renders the shaped member plastic and moldable, and curing said shaped member to render it permanently rigid by elevating the temperature of the solids in the curing zone for a time sufficient to thermoset said plastic sheet.

11. In a method for producing an anatomical apparatus of the type wherein a continuous sealing member conforms to the contour of a body portion, the improvement which comprises the steps of forming said member from a settable reinforced plastic insert by rendering the insert on said body portion plastic, shaping said insert on said body portion to the desired contour, maintaining said shaped insert on said body portion while cooling said shaped insert to render it temporarily rigid, immediately supporting said cooled and temporarily rigid shaped insert by means of an insert-supporting mass of fluent solids, said solids being at a temperature below that which renders said insert deformable, maintaining said shaped insert on said body portion while confining said mass to immobilize said shaped insert, and curing the shaped insert while so immobilized to render it permanently rigid by elevating the temperature of the curing zone for an appreciable time.

12. In a method for producing a frame member formed to fit the contour of a portion of a human body, the steps of heating a thermosetting reinforced plastic sheet to render it plastic, shaping said heated sheet to the body portion, cooling said member immediately after shaping to render it temporarily shape-retaining, supporting the cooled and shaped member by an engulfing mass of fluent solids, said solids being at substantially below the curing temperature and without thermally deforming the member, and curing said supported shaped member in the presence of said solids to render it permanently shape-retaining by maintaining said solids-supported member at an elevated temperature for a time sufficient to thermoset said shaped member.

13. A method of producing an article of manufacture which comprises the process steps of heating a thermosetting, uncured reinforced plastic element to render it moldable without curing, molding the heated element to the desired shape, cooling the molded element to render it temporarily rigid in said desired shape, immobilizing the cooled element within a curing zone by submerging in a mass of fluent solids to support it in its molded form, said fluent solids being at a temperature below that which renders the shaped element non-rigid and moldable, and curing the immobilized element in said zone to produce the permanent molded form of the element.

References Cited by the Examiner
UNITED STATES PATENTS

| | | |
|---|---|---|
| 1,370,800 | 3/1921 | Egerton. |
| 1,377,517 | 5/1921 | Novotny. |
| 1,992,430 | 2/1935 | Johnson _____ 18—1 |
| 2,235,906 | 3/1941 | Skoning. |
| 2,421,099 | 5/1947 | Vogt _____ 18—47 |
| 2,554,356 | 5/1951 | Beare _____ 18—53 |
| 2,622,279 | 12/1952 | Williams _____ 18—47 |
| 2,635,291 | 4/1953 | Cooper et al. _____ 18—27 |
| 2,742,657 | 4/1956 | Sloane _____ 18—55 |
| 2,759,475 | 8/1956 | Van Swaay. |
| 2,775,967 | 1/1957 | Sovinsky _____ 128—141 |
| 2,858,828 | 11/1958 | Matheson _____ 128—141 |
| 3,064,329 | 11/1962 | Westberg et al. |

FOREIGN PATENTS 671,832    5/1952   Great Britain.

OTHER REFERENCES

Gottlob: Technology of Rubber (copy in Scientific Library), 1927, p. 235.

ROBERT F. WHITE, *Primary Examiner.*

JOHN R. KLINE, ALEXANDER H. BRODMERKEL, WILLIAM STEPHENSON, MICHAEL V. BRINDISI, MORRIS LIEBMAN, *Examiners.*